W. H. BERWICK.
PRESSING ELEMENT.
APPLICATION FILED APR. 7, 1920.
1,414,007.
Patented Apr. 25, 1922.
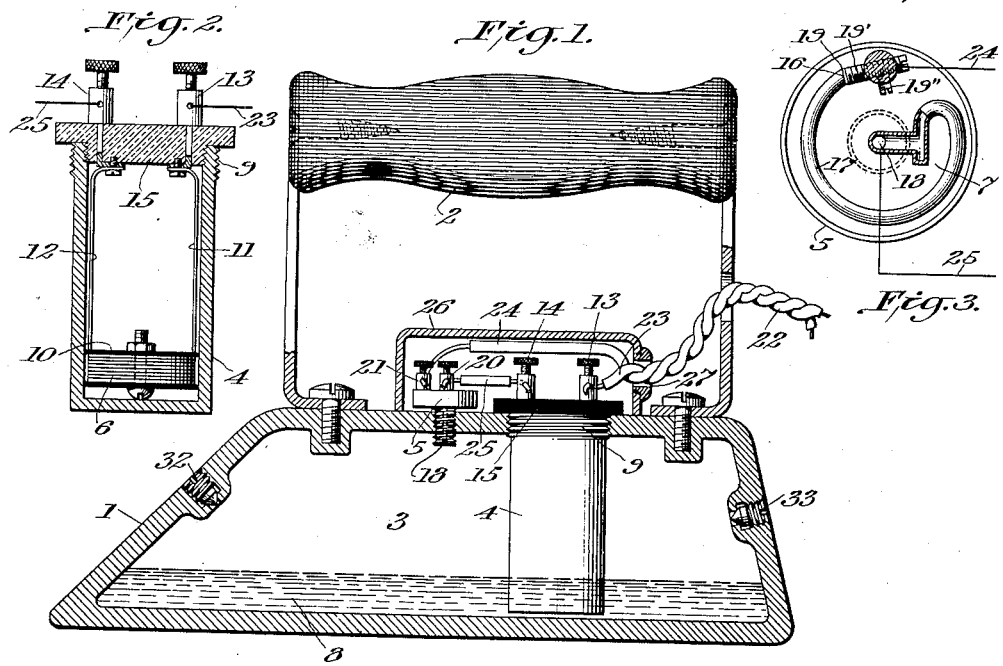
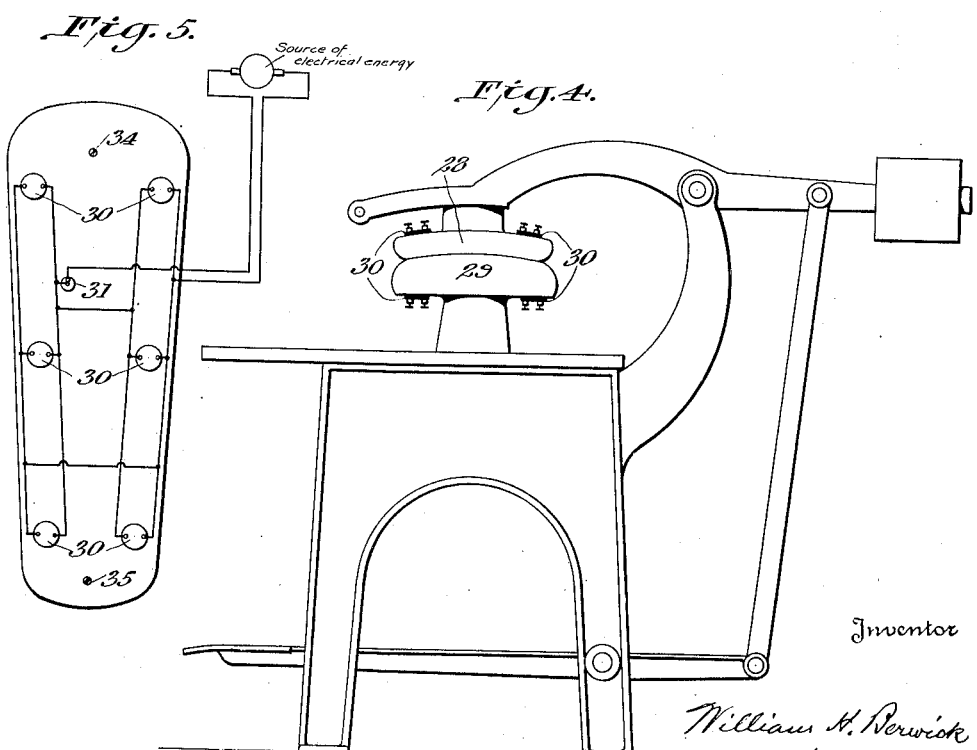
Inventor
William H. Berwick
by
Wm. N. Finckel
Attorney

UNITED STATES PATENT OFFICE.

WILLIAM H. BERWICK, OF SYRACUSE, NEW YORK.

PRESSING ELEMENT.

1,414,007.  Specification of Letters Patent.  Patented Apr. 25, 1922.

Application filed April 7, 1920. Serial No. 372,064.

*To all whom it may concern:*

Be it known that I, WILLIAM H. BERWICK, a citizen of the United States, residing at Syracuse, in the county of Onondaga and State of New York, have invented a certain new and useful Improvement in Pressing Elements, of which the following is a full, clear, and exact description.

This invention relates to devices for pressing materials, such as cloth and the like, and is particularly adapted for pressing wearing apparel.

One of the objects of the invention is to produce a device of this character which is heated by means of the action of an electric heating element, or the like, upon a heat-transmitting medium confined within the device.

Another object is to provide such a device in which the heated medium and the heating element are so disposed that the temperature and consequent pressure produced in the device will automatically control the energizing and deenergizing of the heating element.

Another object is to produce an electrically heated pressing element which is incapable of being heated to such a temperature as to burn or scorch the material operated upon.

Another object is to provide a device of this character wherein the correlation of the heated medium and the heating element is such that through the operation of a controlling element, the temperature of the device may be maintained substantially constant.

To these ends, the invention consists in a pressing element having a hollow, fluid-tight body containing a heat-transmitting medium adapted to be heated by a heating element disposed within the body, this heating element being connected with a source of heat-producing energy and its connection therewith being intercepted by an automatically operating element whereby the circuit between the source of energy and the heating element is automatically controlled relative to conditions of temperature and pressure within the body portion; and the invention consists also in various structural details and arrangements, all as I will proceed now to explain and finally claim.

In the accompanying drawings illustrating the invention, in the several figures of which like parts are similarly designated, Figure 1 illustrates my invention as applied to an ordinary sad-iron, the parts being shown in longitudinal sectional elevation. Fig. 2 is a sectional elevation, on a larger scale, of the heating element. Fig. 3 is a sectional plan view of the controlling element. Fig. 4 is a semi-diagrammatic end view showing the invention applied to a pressing machine. Fig. 5 is a semi-diagrammatic plan view of one of the pressing elements of the machine of Fig. 4 showing the arrangement of the heating elements therein.

Referring particularly to Figs. 1 to 3, in which the principle of the invention and the elements for attaining the desired objects are shown applied to the ordinary hand-operated sad-iron or flat iron, I show a hollow body portion 1 provided with an operating handle 2, both being of otherwise ordinary or any approved configuration. Fitted in the shell of the body portion and extending into its hollow interior cavity 3, are two casings 4 and 5, the casing 4 containing a heating element, here shown as an electrical heating element 6, and the casing 5 containing a controlling element, here shown as a pressure-controlled electric switch 7, hereinafter described more in detail.

The hollow interior cavity 3 of the body is partially filled with a heat absorbing and transmitting medium 8, preferably of such nature as to be vaporized, so that the heat may be evenly distributed. I have found that water is suitable for this purpose up to certain desired temperatures, but when temperatures higher than those obtainable with water are required I may substitute oil or some other medium having a higher boiling point.

The casing 4 is preferably of cylindrical shape and is screw-threaded into the shell of the body portion 1, as at 9. Within this casing is the heating element 6, here shown as a coil of wire, wound upon a suitable insulating mandrel or spool 10, and having its terminals 11 and 12 connected with binding posts 13 and 14 respectively, mounted in a cover 15, preferably of insulating material, threaded into the casing 4. It will be seen that the casing extends into close proximity to the bottom of the cavity 3 and that the heating element 6 is located at the bottom of the casing 4. This is done so that the heat may be transmitted to the medium 8 as directly as possible, though it is not essential.

The controlling element 7 mounted in the casing 5, comprises, as here shown, a pressure operated electric switch, one terminal of which is the end 16 of a Bourdon tube 17, which tube is in direct communication with the cavity 3 through the hollow threaded stem 18. The other terminal 19 is stationary. These terminals are provided with suitable binding posts 20 and 21 respectively, the post 20 being located directly over the stem 18 so as to interfere in no way with the operation of the Bourdon tube. In order that the switch may be adjusted so as to function at different pressures, I provide the terminal 19 on an adjustable member 19' whereby the pressure necessary to open the switch may be increased or diminished, a set screw 19'' providing for locking member 19' in adjusted position.

A two-wire cable 22 connected with a suitable source of electrical energy furnishes current for the heating element. One wire 23 is connected to the binding post 13 of the heating element, and the other wire 24 is connected to the binding post 21 of the switch, the circuit being completed through the switch and the binding posts 14 and 20 and the wire 25.

If desired, the electrical connections may be enclosed in a suitable casing 26 provided with a bushed opening 27 for reception of the cable 22.

A tailor's goose may be equipped in a similar way.

In the application of the invention illustrated in Figs. 4 and 5, the head 28 and buck 29 of the pressing machine are each provided with a plurality of heating elements 30, such, for example, as that already described, so that the heat-transmitting medium confined within them may be quickly raised to the required temperature, but only one pressure-responsive switch 31 is required for each, the wiring being so arranged that all the heating elements of each may be controlled thereby, as shown. It will be understood that the head and buck of the machine are made hollow as in the case of the hand operated iron, and the heating and controlling elements operate in the same manner.

For most efficient operation of the invention when water is used as the heat-transmitting medium, I prefer that only so much water be introduced into the body portion of the device as will be completely vaporized during operation, and for accomplishing such filling, I resort to the following method:—It will be understood that before installation in the device, the pressure-responsive switch is tested so as to open the electric circuit only when the pressure in the cavity reaches that point corresponding to a predetermined temperature. The method of filling is to remove one of the plugs 32 and 33 of the hand iron, or 34 and 35 of the head or buck of the pressing machine, and connect the opening thus provided with a source of the heat-transmitting medium, such as water in vapor form and at the desired temperature. When the cavity has been filled with the vapor to such a pressure as to operate the switch the supply of vapor is cut off and that which is thus trapped in the cavity is allowed to condense. Then the plug is replaced and the condensed fluid is sealed within the cavity.

If it is desired to have a visible signal to indicate when the switch opens, an electric lamp may be put in circuit therewith, it being obvious that the lamp will remain lighted so long as the switch is closed. This method of filling the cavity of the body portion is capable of variation, and, though I prefer it, do not deem it essential.

The operation of the device would seem to be obvious, but in the interest of clearness, it may be said that when current is turned on and the heating element energized, the heat-transmitting medium, if it is water, will be completely vaporized and will in turn heat the pressing element, and the vapor will continue to be heated until its pressure is such as to operate the switch, whereupon the electric circuit through the heating element will be broken until the pressure drops sufficiently to allow the contacts of the switch to again engage and reestablish the circuit. This operation is continuous and automatic so long as current is supplied, and the pressing element is thus kept at a substantially constant predetermined temperature. When current is cut off and the pressing element out of use, the latter will cool, and the heat-transmitting medium confined within it will condense.

It is therefore to be understood that, once the proper quantity of heat-transmitting medium is sealed in the cavity of the body portion 1, it will indefinitely perform its functions of vaporization and condensation.

It will be seen that I provide two plugged openings in the body portion. This is done so that, if desired, the device may be heated by steam in the ordinary manner, the inlet therefor being connected at one opening, and the exhaust at the other.

I have shown and described certain specific embodiments of my invention, but it will be understood that I do not consider the invention as limited thereto, as it is obvious that various changes in details of construction and arrangement of parts may be made without departing from the spirit of the invention or the scope of the following claims.

What I claim is:—

1. In a pressing element, a hollow body portion confining a heat-transmitting medium, a heating element in said body portion, and pressure-responsive means for controlling said heating element.

2. In a pressing element, a hollow body portion confining a vaporizable heat-transmitting medium, a heating element adapted to heat said medium, and pressure-responsive means communicating with said medium and controlling said heating element.

3. In a pressing element, a hollow body portion confining a heat-transmitting medium, a heating element adapted to heat said medium, and means responsive to a predetermined pressure of said medium for de-energizing said heating element.

4. In a pressing element, a hollow body portion confining a heat-transmitting medium, a heating element for heating said medium, and devices for connecting said heating element with a source of electrical energy including a switch element adapted to be opened by pressure within said body portion.

5. In a pressing element, a hollow body portion confining a heat-transmitting medium, a heating element mounted in said body portion and adapted to heat said medium to a predetermined temperature, and means controlling said heating element and adapted to operate at a temperature exceeding that predetermined to interrupt the operation of said heating element.

6. A pressing element, a hollow body by which the pressing is effected, a heat absorbing and transmitting medium inclosed therein, means to heat said medium likewise carried by said body, and a thermal controlling device for the heating means.

7. A sad-iron, having a hollow body, a heat absorbing and transmitting agent confined within said body, an electrical heating member arranged in said body and in contact with said agent, and means responsive to variations in temperature and consequent variations in pressure to cut in and cut out the electrical heating member.

8. A sad-iron, having a hollow body containing a liquid, an electrical heating unit fixed in said body in contact with said liquid and adapted to heat it, and an automatic circuit closer exposed to said liquid and connected in circuit with the heating unit and responsive to variations in temperature and consequent variations in pressure within the body.

In testimony whereof I have hereunto set my hand this sixth day of April A. D. 1920.

WILLIAM H. BERWICK.

Witnesses:
PHILIP F. LARNER,
W. H. FINCKEL, Jr.